US011186257B2

(12) United States Patent
Obaidi (10) Patent No.: US 11,186,257 B2
(45) Date of Patent: Nov. 30, 2021

(54) AUTOMOBILE DRIVER BIOMETRIC AUTHENTICATION AND GPS SERVICES

(71) Applicant: T-Mobile USA, Inc., Bellevue, WA (US)

(72) Inventor: Ahmad Arash Obaidi, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 336 days.

(21) Appl. No.: 16/404,870

(22) Filed: May 7, 2019

(65) Prior Publication Data

US 2020/0353894 A1 Nov. 12, 2020

(51) Int. Cl.
| | |
|---|---|
| *B60R 25/25* | (2013.01) |
| *B60R 25/08* | (2006.01) |
| *B60R 25/102* | (2013.01) |
| *G05D 1/02* | (2020.01) |
| *H04W 4/021* | (2018.01) |
| *B60R 25/33* | (2013.01) |
| *G01S 19/51* | (2010.01) |

(52) U.S. Cl.
CPC .............. *B60R 25/25* (2013.01); *B60R 25/08* (2013.01); *B60R 25/102* (2013.01); *G05D 1/021* (2013.01); *H04W 4/021* (2013.01); *B60R 25/33* (2013.01); *G01S 19/51* (2013.01)

(58) Field of Classification Search
CPC ..................................................... B60R 25/25
See application file for complete search history.

(56) References Cited

U.S. PATENT DOCUMENTS

| | | | | |
|---|---|---|---|---|
| 9,081,650 | B1 * | 7/2015 | Brinkmann | G07C 5/008 |
| 9,123,186 | B2 * | 9/2015 | Ricci | B60H 1/00742 |
| 9,988,016 | B1 * | 6/2018 | Bianchi, III | H04W 12/06 |
| 10,246,098 | B2 * | 4/2019 | Fung | B60W 40/08 |
| 10,882,493 | B2 * | 1/2021 | Foster | G06Q 20/3224 |
| 2014/0272811 | A1 * | 9/2014 | Palan | H04W 4/44 434/66 |

(Continued)

FOREIGN PATENT DOCUMENTS

| | | | |
|---|---|---|---|
| JP | 2019032711 A | * | 2/2019 |
| JP | 2019032712 A | * | 2/2019 |

(Continued)

*Primary Examiner* — Alex C Dunn
(74) *Attorney, Agent, or Firm* — Troutman Pepper Hamilton Sanders LLP; James E. Schutz; Christopher C. Close, Jr.

(57) ABSTRACT

Systems and methods for authenticating users to operate a vehicle are disclosed. The system can receive biometric data from a sensor on user equipment (UE) or a sensor installed in the vehicle. The system can also receive location data from the UE and the vehicle. The biometric data can be compared to stored biometric data for one or more authorized users. The location data of the UE and the location data of the vehicle can be compared to determine the proximity thereof. When the biometric data matches at least one biometric profile in the stored biometric data and the UE location data is within a predetermined distance of the vehicle location data, the user can be authenticated to operate the vehicle. The system can also detect risky driving behavior and assume control of the vehicle or report the behavior to authorities.

16 Claims, 7 Drawing Sheets

(56) References Cited

U.S. PATENT DOCUMENTS

| | | | | |
|---|---|---|---|---|
| 2014/0309838 | A1* | 10/2014 | Ricci | B60R 25/20 |
| | | | | 701/25 |
| 2014/0309891 | A1* | 10/2014 | Ricci | G05D 1/0016 |
| | | | | 701/48 |
| 2018/0043901 | A1* | 2/2018 | Kim | A61B 5/021 |
| 2018/0154865 | A1 | 6/2018 | Bianchi, III et al. | |
| 2019/0039570 | A1* | 2/2019 | Foster | G06Q 20/3224 |
| 2020/0233940 | A1* | 7/2020 | Edwards | H04L 63/0861 |
| 2020/0257299 | A1* | 8/2020 | Wang | G05D 1/0255 |
| 2020/0283004 | A1* | 9/2020 | Avetisian | B60W 30/18009 |
| 2021/0122335 | A1* | 4/2021 | Foster | B60R 25/25 |

FOREIGN PATENT DOCUMENTS

| | | |
|---|---|---|
| WO | 2015200224 A3 | 12/2015 |
| WO | 2017066286 A1 | 4/2017 |
| WO | 2017136725 A1 | 8/2017 |

\* cited by examiner

AUTOMOBILE DRIVER BIOMETRIC AUTHENTICATION AND GPS SERVICES

BACKGROUND

Automotive manufacturers constantly look for ways to increase the automation of street vehicles with the ultimate goal of producing fully automated personal vehicles in the near future. As of now, fully automated vehicles have been tested in real-world driving conditions, but only with a skilled test driver behind the wheel as a safety backup. Although automation is generally seen as a path to improving safety over manually driven vehicles, the occurrence of recent high-profile accidents involving self-driving vehicles highlight the fact that the main challenges to achieving full automation are almost exclusively related to safety.

Although fully autonomous personal vehicles are currently a thing of the future, many automobile manufacturers now offer partial automation in newer cars. These features to date are fairly limited, and with the exception of some newer model cars that have self-braking, lane keeping, or parking assist, the speed and trajectory of vehicles are largely controlled by the driver. Other safety features such as, for example, backup cameras, parking cameras, lane detectors, and eye movement detectors, are also being added to improve safety of cars, but only to the extent that they provide warnings and indications to drivers. Drivers can, and often do, violate traffic laws, become distracted, and engage in other risky driving practices (e.g., texting and driving). As a result, vehicle accidents remain commonplace, resulting in property damage, personal injury, and sometimes death.

As of this writing, the Association for Safe International Road Travel (ASIRT) estimates that road traffic crashes rank as the $9^{th}$ leading cause of death worldwide, accounting for 2.2% of all deaths globally. ASIRT also reports that road traffic crashes are the leading cause of death among young people ages 15-29 and are the second leading cause of death worldwide among children ages 5-14.[1] In the United States (US), in 2016, traffic accidents accounted for approximately 37,000 fatalities according to National Highway Traffic Safety Administration[2] data, which account for between 1% and 2% of the total number of deaths in the US for that year reported by the Centers for Disease Control and Prevention.[3]

[1] https://www.asirt.org/safe-travel/road-safety-facts/ accessed on Mar. 14, 2019
[2] "2016 Fatal Motor Vehicle Crashes: Overview", U.S. Department of Transportation National Highway Traffic Safety Administration, DOT HS 812 456, October 2017, accessed from https://www.nhtsa.gov/press-releases/usdot-releases-2016-fatal-traffic-crash-data on Mar. 14, 2019
[3] Jiaquan Xu et. al., "Deaths: Final Data for 2016", National Vital Statistics Reports, vol. 67, no. 5, Jul. 26, 2018

Drivers often engage in risky behavior such as, for example, speeding or running a red light. And, because 100% enforcement is not possible, this behavior often goes unnoticed and unpunished. In most cases, enforcement requires a police officer to follow in a police vehicle behind the risky driver, signal the driver to pull over, and then issue a citation. Even this relies on the compliance of the driver, however, to pull over and receive the legal citation (which itself can present certain risks). Due to the relative scarcity of police officers, however, in most cases no police officer is present to observe such risky driving. As a result, there are often no consequences to such behavior (e.g., no citation is given).

Isolated solutions to this problem have been implemented including putting cameras at traffic lights, flying drones, tracking vehicle travel time between different toll gates on a toll road, etc. Traffic tickets related to traffic lights and drones are typically issued to the owner of the vehicle, irrespective of who was actually driving the vehicle. As a result, an owner who was not driving must often appear in court to prove that they were not driving (if such was the case), incurring time and expense on both the vehicle owner and the jurisdiction issuing the ticket. Further, these solutions do not serve to provide any control or feedback to the vehicle or risky driver, nor do they provide real-time warnings to drivers, pedestrians, or others who may be in the path of the risky driver.

Although not directly addressing this problem, technology currently exists to track driving practices that can incentivize drivers to drive more safely, at least during a monitoring period. Currently, some insurance companies offer tailored automobile insurance rates for customers who volunteer to install an application on their smart phone or a dongle in their vehicle's OBD-II port that tracks driving events (e.g., speed, hard braking, and fast acceleration). This technology is passive, however, and does not affect the functionality of the vehicle. The smart phone application has a limited ability to determine who is driving, for example, and the dongle has no ability to determine who is driving. In this solution, there is no communication between the dongle and the smart phone. Further, the primary purpose of this solution is to enable an insurance company to set an insurance premium based on a driver's typical driving habits over a significant length of time. This still provides only a limited monitoring period, however, and does not provide real-time safety features. In many cases, the dongle has no communication functionality, for example, and must be mailed to the insurance company to enable the insurance company to read the data gathered during the monitoring period.

It is therefore desirable to provide improved systems and methods for providing increased vehicle safety through automation in both new vehicle designs and in aftermarket solutions for older, less sophisticated, vehicles.

BRIEF DESCRIPTION OF THE DRAWINGS

The detailed description is set forth with reference to the accompanying figures. In the figures, the left-most digit(s) of a reference number identifies the figure in which the references number first appears. The use of the same reference numbers in different figures indicates similar or identical items or features.

DETAILED DESCRIPTION

Fully automated, or "self-driving," vehicles represent the potential for safer vehicle travel. Self-driving vehicles can be programmed to follow traffic laws, for example, and to utilize safe driving practices. Because the overwhelming majority of vehicles on the road have little to no automation and little to no vehicle-to-vehicle communication, however, self-driving vehicles in real-world conditions today often rely heavily on internal and external sensors such as cameras, motion detectors, accelerometers, and the like for monitoring their surroundings and maneuvering, among other things. As standard personal vehicles become more automated, self-driving vehicles may be able to rely more on vehicle-to-vehicle communication and expected driving patterns of partially automated vehicles, thereby lowering the barrier to entry for a completely autonomous vehicle. It is therefore more likely that the transition from traditional, user (or, "manually") driven vehicles to fully automated vehicles will be marked by incremental increases in vehicle automation, rather than wholesale adoption.

To this end, it would be useful to have systems and methods for providing automated, real-time[4], incentives for safe driving practices and/or real-time remediation for risky driving scenarios. Further, it would be useful for the systems and methods to facilitate vehicle-to-vehicle communications to provide a means for reporting risky driving and lower the barrier for increased automated self-driving functionality. In some examples, risky driving could be instantly reported to law enforcement and a citation issued remotely to the driver (similar to current traffic cameras). In other examples, an officer could be deployed to intercept the vehicle. As vehicles become increasingly automated, law enforcement could also provide control commands to the vehicle to cut power to the vehicle, limit the maximum speed of the vehicle, command the vehicle to drive to a secure location, lock the doors, etc.

[4] As used herein, the term "real-time" means as quickly as is practical. Due to signal propagation time, processing time, and other factors this may not be "instantaneous," but is intended to convey that the data is received or provided as quickly as it can be received or transmitted, or "without delay."

It would also be useful if risky driving could be reported to vehicles, pedestrians, and others in the vicinity of the risky driving. Other vehicles or mobile devices could be in communication with law enforcement and receive real-time alerts from law enforcement. As vehicles become increasingly automated, other vehicles could also be re-routed to avoid the risky driver or drive to a safe location. With vehicle-to-vehicle communication, real-time alerts could originate from vehicles and need not originate from law enforcement or other service providers. Indeed, drivers may be incentivized to utilize systems for reporting risky driving to law enforcement by receiving an automobile insurance discount or other perk. Such systems can also be used as a method for remediation when a driver has received a citation, for example, as an alternative to having the driver's license revoked or suspended.

It may also be useful to respond to risky driving scenarios that are indicative of a medical emergency. A driver suffering a medical condition such as a heart attack, seizure, or stroke, for example, may not be able to drive to a secure location. In this scenario, a vehicle emergency response system could be engaged, either by the driver or through automatic detection (e.g., using a "risky driving" algorithm), to send a message to an emergency number. With increased vehicle automation, the emergency response system may be able to take full, or partial, control of the vehicle to turn on hazard lights, slow the vehicle, command the vehicle to drive to a secure location, etc.

It may also be useful to provide drivers with travel services. A driver can be in communication with a travel service, for instance, that offers lodging, food, gas, electric vehicle recharge, tickets to a concert or other entertainment, etc. When it is safe to do so (e.g. when the driver is parked) the travel service can communicate offerings to the driver through the vehicle or through the driver's smart phone. The driver can then have the option of purchasing offerings. Additionally, or alternatively, certain offerings can be purchased automatically. For example, a driver could have a profile that includes favorite dinner orders at various national chain restaurants that include pre-order options. While driving, therefore, the driver could verbally ask a system inside the vehicle to find the nearest of these restaurants, pre-order their favorite dinner, and provide navigation to the restaurant. Drivers may be further incentivized to utilize systems that incorporate automated risky driving detection and remediation, for example, if these systems also offer other conveniences, such as automated travel service offerings.

It may also be useful to provide a system that utilizes GPS devices to generate geofences around various, potentially vulnerable, people or objects. A pedestrian or a wheel chair, for example, could carry a mobile cellular device with a GPS, Wi-Fi, or cellular location services to provide location data. The mobile device, in turn, could transmit coordinates defining the geofence and a speed limit or exclusion area associated with the geofence. Vehicles utilizing the system to avoid risky driving practices could then be provided with the geofence data from the pedestrian or wheel chair to alert or reroute the driver. Navigational systems could utilize geofence data in a similar way to how navigational systems currently use traffic data to determine the shortest route (by time) of travel. As vehicles become more automated, geofence data can also be used to control the speed and trajectory of the vehicle. Geofences could also be established around temporary street closures, stop lights, stop signs, school buses, vehicles engaging in risky driving practices, student drivers, emergency response vehicles, police vehicles, bicycles, motorcycles, etc.

Figure 1:
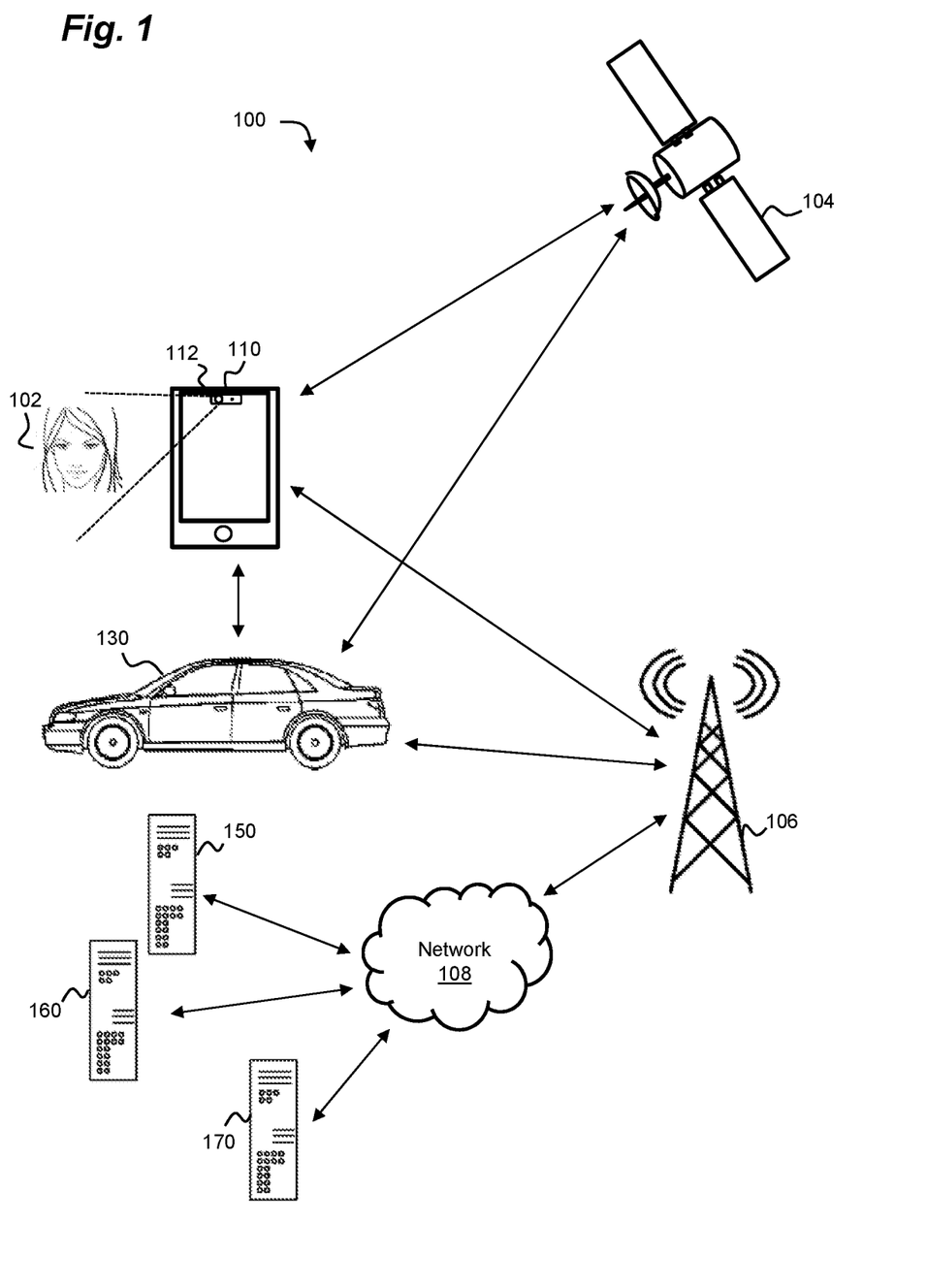
FIG. 1 depicts an example of a system for communicating with a vehicle and authenticating a user with the vehicle through biometric data and GPS data, in accordance with some examples of the present disclosure.

It is an object of this disclosures to present example systems and methods to meet these needs. Some examples of the present disclosure, as illustrated in FIG. 1, can include an authentication and communication system 100 to pair a user 102 with a vehicle 130 and to provide real-time GPS, vehicle, and/or driving sensor data to law enforcement, emergency response, or other service provider systems 150, 160, 170. As shown, a user's equipment (UE) 110 such as a smart phone, tablet, computer, etc. can include a biometric sensor 112, such as a camera for facial recognition, fingerprint reader, etc., a GPS receiver for receiving data from a GPS satellite 104, and a transceiver or data port to communicate with the vehicle 130. The vehicle 130 can also have a GPS sensor receiving data from the GPS satellite 104 and a transceiver or data port that can facilitate communications between the UE 110 and the vehicle 130. The UE 110 and/or the vehicle 130 can have a transceiver (e.g., a cellular transceiver) in communication with a communication node 106 (e.g., a cell tower) connected to a network 108 and ultimately to the service provider systems 150, 160, 170.

Pairing of the user 102 with the vehicle 130 can be accomplished by performing biometric authentication between the user 102 and the UE 110, determining a GPS location of the UE 110, and transmitting a message from the UE 110 to the vehicle 130 that includes the biometric identification of the user 102 and the GPS location of the UE 110. The vehicle can then determine its own GPS location and compare the GPS location of the vehicle 130 to that of the UE 110 to positively determine that the UE 110 is within a predetermined distance (e.g., inside) of the vehicle 130. Alternatively, or additionally, pairing of the user 102 with the vehicle can be accomplished by the vehicle 130 transmitting its GPS data to the UE 110 and the UE 110 comparing the GPS data.

Once paired, the vehicle 130 and/or the UE 110 can communicate data including vehicle diagnostic data, vehicle speed, vehicle acceleration, vehicle sensor data, UE sensor data, location data (e.g., GPS, Wi-Fi, cellular location data, etc.) with law enforcement, emergency response, or other service provider systems 150, 160, 170. Data can be communicated through a cellular or other wireless (e.g., Wi-Fi) transceiver in the UE 110 or the vehicle 130 through the communication node 106 connected to the network 108 and ultimately to the service provider systems 150, 160, 170. In areas with low cell coverage, Wi-Fi, Bluetooth®, satellite, or other wireless communication can also be used.

While the user 102 is driving, the UE 110 paired to the vehicle 130 can remain in communication with the vehicle 130 to transmit and receive data to and from the vehicle 130 and to the service provider systems 150, 160, 170. Because many smart phones already have such connectivity capabilities, this solution is advantageous as it requires little, or no, additional hardware. Additionally, or alternatively, the vehicle 130 can include a transmitter that can connect to the communication node 106 to communicate to the service provider systems 150, 160, 170. This configuration may be desirable when, for example, an autonomous vehicle drives itself (with or without a UE 110 onboard), when the UE 110 becomes damaged or the battery dies, or when it is more cost effective to communicate via the vehicle rather than through the UE 110.

The system 100 can also be used to issue automated speeding tickets. A law enforcement system 150 can be provided GPS position data and speed data of the vehicle 130, determine the speed limit for the area based on the GPS data, compare the speed vehicle data against the speed limit, and issue a ticket automatically. In addition, when the user 102 is biometrically paired with the vehicle 130, the speeding ticket can be issued directly to the user 102. This is an improvement over current systems such as stop light cameras, for example, which can only issue tickets based on the vehicle.

The system 100 can also facilitate vehicle-to-vehicle communications. The system 100 illustrated in FIG. 1 can include vehicles 130 capable of connecting to the communication node 106 and/or vehicles 130 that are paired with a UE 110 capable of connecting to the communication node 106. Each vehicle 130 can also include a GPS sensor and/or rely on GPS data from a UE 110.

In some examples, it may be advantageous for vehicles to communicate with other vehicles without going through network 108 or involving the service provider systems 150, 160, 170. At the beginning of a hard-braking event, for instance, a vehicle could communicate to the vehicle behind it to provide the following vehicle an early warning to apply the brakes. The warning can comprise an audible alarm or heads up display in if the following vehicle (i.e., if the vehicle is manually driven) or a signal to automatically applying the brakes in the following vehicle (i.e., when the following vehicle is operating fully, or partially, autonomously).

In other examples, it may be advantageous for vehicles to communicate with other vehicles through the service provider systems 150, 160, 170. A service could collect aggregate data from vehicles in a vicinity, for example, analyze the data to predict traffic patterns, and send messages to vehicles based on the analysis. The messages can be received by the vehicles to provide instructions, warning, or other indicators to a human driver and/or an automated control signal to automated systems in vehicles.

Figure 2:
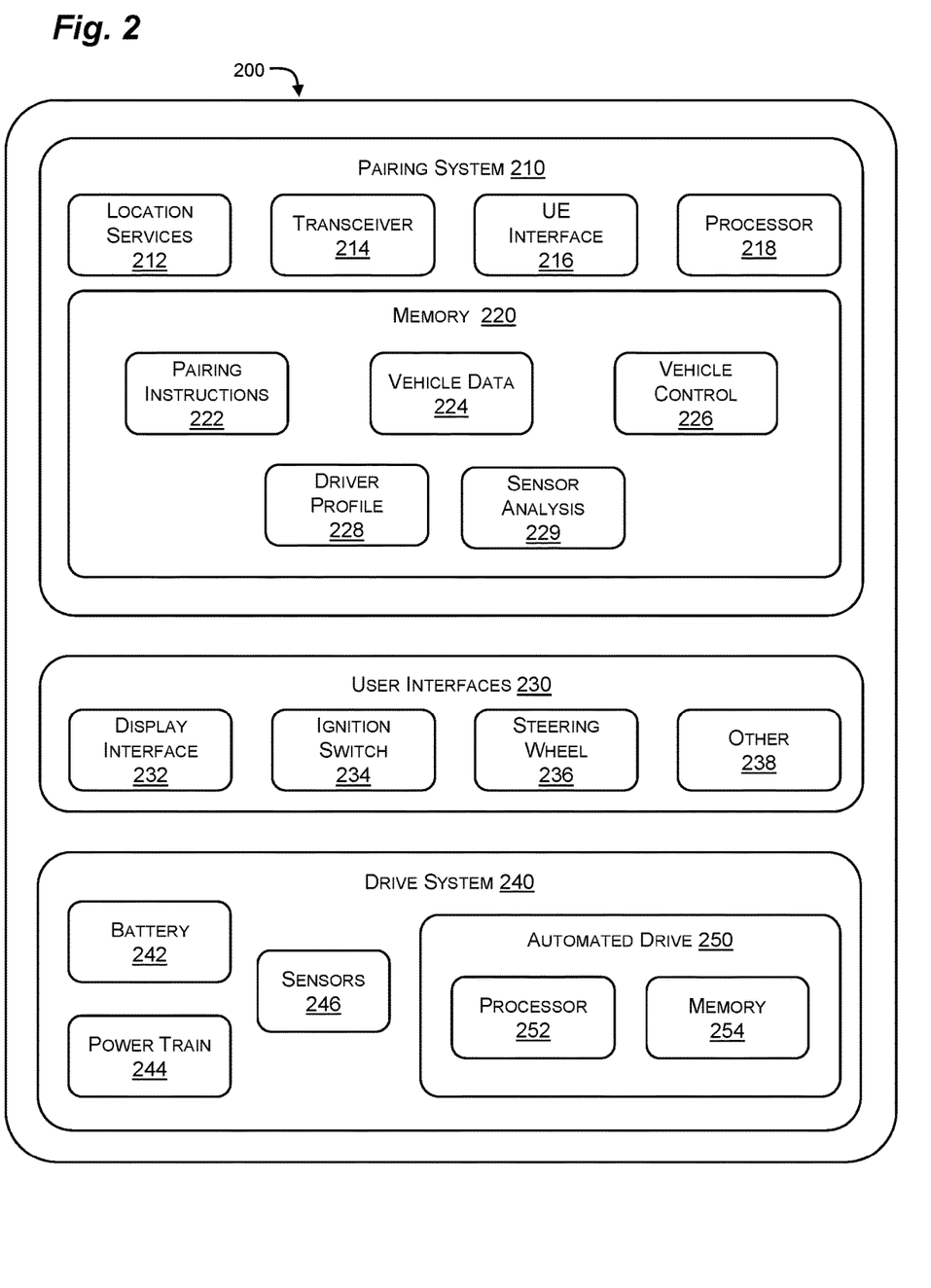
FIG. 2 depicts an example of a vehicle system for use with systems and methods disclosed herein, in accordance with some examples of the present disclosure.

FIG. 2 illustrates an example of a vehicle system 200 for the vehicle 130. As above, the vehicle system 200 can have location services 212 (e.g., GPS, cellular, or wireless location services) to gather position data from the GPS satellite 104, for example, and a UE interface 216 to send data back and forth with the UE 110. The vehicle system 200 can also include a wireless transceiver 214 (e.g., a cellular or Wi-Fi transceiver) or can communicate outside of the vehicle 130 via the UE 110 to which it is paired. The vehicle system 200 can also include a processor 218 and memory 220 with pairing instructions 222 that can be executed by the processor to pair the vehicle system 200 to the UE 110.

In some examples, the memory 220 can also include a driver profile 228 that includes a biometric profile of a registered user of the vehicle. As mentioned above, the vehicle 130 can compare a stored biometric profile to biometric data received from the UE 110 as part of the process of authenticating the user 102 and pairing the UE 110 with the vehicle 130. Additionally, or alternatively, the UE 110 can include a stored biometric profile of the registered user of the UE 110. The UE 110 can then gather biometric data, compare the biometric data to the stored biometric profile, and then provide data to the vehicle 130 either authenticating the registered user or alerting the vehicle 130 that the biometric data does not match. In some examples, multiple users can be registered on the UE 110 and/or the vehicle 130. As a result, both the UE 110 and the vehicle 130 can each include multiple biometric profiles, one for each registered UE user and authorized vehicle driver respectively.

The memory 220 can also include additional data or instructions such as vehicle data 224 (e.g., speed, gear, acceleration, etc.), which can be provided to a service provider system 150, 160, 170 or to another vehicle, among other things. The memory 220 can also comprise vehicle control 226 instructions to provide automated control commands to other systems in the vehicle 130 including, for example, a drive system 240 or ignition switch 234 (discussed below). This may enable one of the service provider systems 150, 160, 170 (e.g. the law enforcement system 150) to slow or turn off the vehicle remotely, for example, to end a police chase, among other things. The memory 220 can also include the driver profile 228, which can include driver preferences for vehicle operations, automated travel services, etc.

The memory 220 can also include sensor analysis 229 instructions that can be executed by the processor 218 to analyze data from sensors 246 (e.g., the vehicle speed sensor (VSS), accelerometers, etc.) in the vehicle 130 and/or sensors 346 in the UE 110 (discussed below) to determine if the sensors 246, 346 have detected risky driving. When the vehicle system 200 is paired with a UE 110, the UE 110 can send sensor data such as, for example, accelerometer data, camera data, and microphone data to the vehicle 130, and the sensor analysis 229 instructions can include instructions for analyzing the sensor data from the UE 110. Risky driving events such as hard braking, fast accelerating, and speeding, for instance, could be detected by analyzing sensor data from the VSS together with data from an accelerometer in the UE 110 and GPS data from either the vehicle 130 or the UE 110.

The location services 212, wireless transceiver 214, UE interface 216, processor 218, and memory 220 can be part of a pairing system 210 that can be integral to the vehicle 130 or as a standalone system. Currently, vehicles with higher trim packages often include a stereo head unit with a navigational system including built-in GPS, a USB connector for communicating with a smart phone or tablet, a Bluetooth® transceiver for communicating with a smart phone or other Bluetooth® device, a processor for controlling the head unit, memory with instructions for controlling the head unit, connectors for communicating with other vehicle systems including a controller area network (CAN bus), on-board diagnostics (OBD) bus (e.g., an OBD-II bus), parking cameras, stereo system, passenger entertainment systems, passenger comfort systems, etc. Such head units could be adapted to perform one or more of the functions of the pairing system 210. The GPS sensor in the head unit's navigation system could serve as the location services 212; the USB or Bluetooth® communication could serve as the UE interface 216; the processor in the head unit could serve as the processor 218; and the memory within the head unit could be programmed to serve as memory 220. Of course, an electronic control unit (ECU), engine control module (ECM), body control module (BCM), or other existing component in the vehicle 130 could also serve some, or all, of these functions.

For vehicles without these features, an aftermarket driver authentication device could be installed in a vehicle. Such a device could serve as the pairing system 210 and could connect to other vehicle systems through an OBD-II port, CAN connection, or through other vehicle connections in a similar manner to aftermarket head units, sensors, cameras, entertainment systems, etc. The aftermarket device could be a dongle that can connect to the OBD-II port of the vehicle, for example, and can include the location services 212, the processor 218, and memory 220 illustrated in FIG. 2. The UE interface 216 of the dongle could include a Bluetooth® or Wi-Fi transceiver, a USB port, or other such transceiver or port to interface with the UE 110.

In some examples, the pairing system 210 can communicate with other vehicle components and systems such as user interfaces 230 and drive system 240 components. The pairing system 210 can provide commands, data, and/or executable instructions to give the driver alerts, warnings, or other messages. Upon an unsuccessful pairing attempt, for example, a display interface 232 can provide a message to indicate the unsuccessful pairing, the vehicle's ignition switch 234 can remain inoperable, the steering wheel 236 can lock, and/or another indicator 238 such as a light in the dash or an audible alert could sound. Similarly, the vehicle system 200 could communicate through the user interfaces 230 when the vehicle is exceeding the speed limit, about to run a red light or a stop sign, approaching a pedestrian, etc. to assist the driver in avoiding accidents and maintaining safe driving practices. Of course, in addition to functioning together with the pairing system 210, the user interfaces 230 can also communicate with other systems and components in the vehicle 130 in their normal fashion.

Although not shown, the pairing system 210 could also include its own user interfaces. In some examples, when the pairing system 210 is part of a head unit with an interactive display screen, for example, the interactive display screen can serve as the display interface 232. In other examples, when the pairing system 210 is part of a dongle connected to the OBD-II port, the dongle can include a display screen, buttons, or touchscreen. Although not shown, the pairing system 210 could also include its own sensors for detecting risky driving practices such as gyroscopes, accelerometers, cameras, microphones, proximity sensors, etc. In addition to, or as an alternative to, providing user interfaces 230 within the vehicle 130, the UE 110 could be programmed with an application that displays data received from the pairing system 210 and/or provides commands to the vehicle system 200 via the pairing system 210.

Generally, vehicles include some sort of drive system 240 that controls the vehicle. As shown in FIG. 2, the drive system 240 can include a battery 242, power train 244 (e.g., engine, motor, transmission, etc.), sensors 246, and an automated drive 250. In some examples, the automated drive 250 can include one or more separate processors 252 and memory 254. The complexity of drive systems in modern vehicles varies from one vehicle to another with ever more sophisticated systems being developed. To this end, alternative drive systems and drive systems not yet developed are intended to be included in the scope of this disclosure. It is contemplated that the pairing system 210 can be adapted to effectively interface with a variety of drive systems.

The power train 244 can include an internal combustion engine, an electric motor, a hybrid, or other suitable power source. The battery 242 can be a traditional car battery (e.g., a lead-acid or absorbed glass mat (AGM) battery) for an internal combustion engine, a rechargeable battery pack (e.g., a lithium ion battery pack), a capacitor, or other suitable electrical power source to power vehicle 130 systems and/or to drive an electric motor in the power train 244. The sensors 246 can include temperature sensors, humidity sensors, odometers, accelerometers, proximity sensors, and other sensors associated with the drive system 240. In addition to providing data to the pairing system 210, the sensors 246 can provide data to the drive system 240 and other systems within the vehicle.

For ease of explanation, the automated drive 250 is illustrated as simply having a processor 252 and a memory 254. In actuality, in most current vehicles, automated functionality is carried out by myriad individual electronic units each having their own processor, with the electronic units communicating using a decentralized protocol, such as a CAN bus. To this end, it is contemplated that the pairing system 210 can be adapted to interface with a centralized automated drive processor, individual electronic units, or other architectures. In some examples, the pairing system 210 can send command instructions to one or more processors 252 of the automated drive 250 to cause the vehicle to perform one or more automated driving functions or operations.

In some examples, the drive system 240 can include a speedometer to provide the speed of the vehicle to the pairing system 210. The sensor analysis 229 instructions in the memory 220 of the pairing system 210 can include instructions to receive the speedometer reading, gather GPS position data from the location services 212, provide the position data to a local authority, receive data from the local authority on the speed limit for that position, and compare the speedometer speed data to the speed limit. When the vehicle is speeding, for example, the vehicle system 200 can send instructions from the vehicle control 226 to the one or more processors 252 of the automated drive 250 commanding the vehicle 130 to slow down. In some examples, a camera, or other sensor, on the vehicle 130 can be used to read and interpret street signs for real-time speed limit data. Real-time speed limit data can be useful to provide the most up to date speed limits. In addition to, or as an alternative to, receiving local speed limit data in real-time, the memory 220 can also include pre-loaded speed limit data (e.g., GPS maps with this information). The pre-loaded speed limit data can be used as a default to minimize the amount of real-time transmissions and/or to serve as a backup for when communications with the local authority are unavailable.

In some examples the pairing system 210 can receive sensor data from the drive system 240, other vehicle subsystems, and/or UE 110, and analyze the data to determine a high likelihood of a medical emergency, risky driving, or even a kidnapping. As automated driving systems become more sophisticated, it may become possible for the pairing system 210 to provide commands that essentially take control of the vehicle 130 and drive the vehicle 130 to a safe location in response to such events. In a medical emergency, for example, the vehicle 130 can be autonomously taken to the nearest medical facility.

Figure 3:
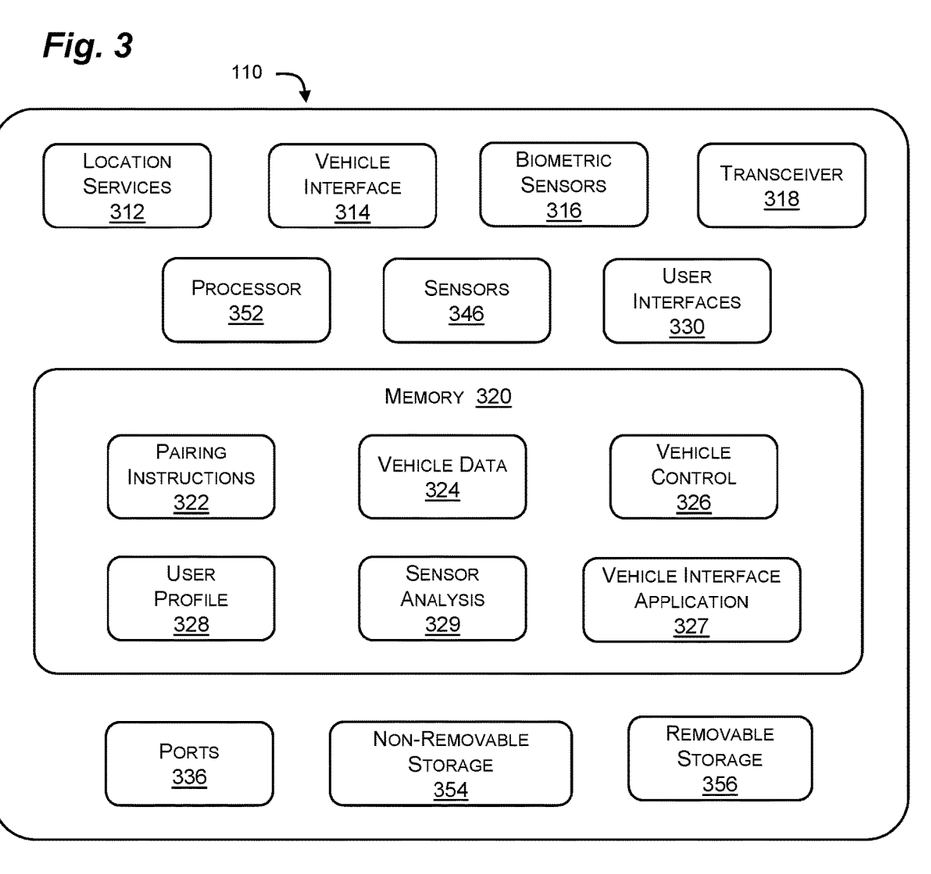
FIG. 3 depicts an example of a system for a user's equipment (UE) for use with the systems and methods disclosed herein, in accordance with some examples of the present disclosure.

FIG. 3 illustrates an example of a UE 110 (e.g., a cell phone, smartphone, laptop, tablet, etc.). As mentioned in relation to FIG. 1, the UE 110 can have a location services 312 (e.g., a GPS receiver, cellular or Wi-Fi location services, etc.) to gather position data from a GPS satellite 104, Wi-Fi routers, communication nodes 106, etc. The UE 110 can also include a vehicle interface 314 to send and receive data to and from the vehicle 130, and one or more biometric sensors 316 to capture biometric data of a user 102. The UE 110 can also include a transceiver 318 to communicate with the vehicle system 200 and/or the communication node 106. The UE 110 can also include a processor 352 and memory 320 with pairing instructions 322 that can be executed by the processor 352 to authenticate the user 102 and pair the UE 110 to the vehicle system 200. The pairing instructions 322 can include instructions to activate the biometric sensors 316 to collect biometric data, collect data from the location services 312, and transmit the data to the vehicle 130, among other things. As described in relation to FIG. 2, the vehicle 130 can then execute pairing instructions 222 on the processor 218 to authenticate the driver and pair the UE 110 with the vehicle 130. Alternatively, or additionally, the UE 110 can receive GPS data from the vehicle 130 to enable the pairing instructions 322 to authenticate the driver and pair with the vehicle 130.

In some examples, the memory 320 can also comprise a user profile 328 that includes a biometric profile of a registered user of the UE 110. The pairing instructions 322 can then instruct the processor 352 to compare the biometric data to the biometric profile on the UE 110. As described in relation to FIG. 2, the UE 110 can then provide data to the vehicle either authenticating and/or identifying the registered user of the UE 110 or alerting the vehicle 130 that the biometric data does not match the biometric profile. In some examples, multiple users can be registered on the UE 110 and/or the vehicle 130, and it may be advantageous for both the UE 110 and the vehicle 130 to each include multiple biometric profiles, one for each registered user and authorized vehicle driver, respectively. The user profile 328 can also include user preferences related to driving preferences (e.g., no interstates), personal speed restrictions, automated travel services, etc. These user preferences can be stored in the user profile 328 on the UE 110 in addition to, or as an alternative to, storing such preferences in the driver profile 228 on the vehicle 130.

The memory 320 can also include additional data or instructions such as vehicle data 324, vehicle control 326 instructions, and sensor analysis 329. The vehicle data 324 can be stored in the UE 110 to facilitate providing vehicle data to service provider systems 150, 160, 170, other vehicles, advertisers, etc. Vehicle control 326 instructions can also be stored on the UE 110, in addition to storing vehicle control 226 instructions on the vehicle system 200. In some examples, the vehicle control 326 instructions can be transmitted from the UE 110 to the pairing system 210. The pairing system 210, in turn, can transmit the vehicle control 326 instructions to vehicle subsystems to control the vehicle as described in relation to vehicle control 226, illustrated in FIG. 2. In addition to, or as an alternative to, storing instructions to perform sensor analysis 229 on the vehicle system 200, the UE 110 can also include sensor analysis 329 instructions.

As mentioned above, both the UE 110 and the vehicle 130 can include sensors 346, 246, and risky driving can be determined based on analysis of sensor data from one or both of the UE 110 and the vehicle 130. It may be advantageous for a certain amount of preprocessing to be executed on UE sensor data on the UE 110, for example, before the data is transmitted to the vehicle 130. Alternatively, it may be advantageous to perform all sensor processing at the vehicle system 200 to enable the vehicle 130 to operate normally even when the UE 110 becomes disconnected from the vehicle 130. In other cases, if the UE 110 has significantly more processing power than the vehicle 130, for example, it may be advantageous for the bulk of the sensor analysis to be performed on the UE 110 to reduce the processing load on the vehicle system 200.

In addition to providing user interfaces 230 in the vehicle 130 (as discussed above), the UE 110 can also include a vehicle interface application 327 to display data received from the pairing system 210 of the vehicle 130 on one or more user interfaces 330. In some examples, the user 102 can use the vehicle interface application 327 to provide commands to the vehicle system 200 by inputting commands in the user interfaces 330 on the UE 110. The user interfaces 330 can also be used to give the driver alerts, warnings, or other messages. Upon an unsuccessful pairing attempt, for example, the user interface 330 could provide a message to indicate the unsuccessful pairing and alert the user 102 that the vehicle 130 has been locked out. Similarly, the UE 110 could communicate through the user interfaces 330 when the vehicle is exceeding the speed limit, about to run a red light or a stop sign, approaching a pedestrian, etc. to assist the driver in avoiding accidents and maintaining safe driving activities. Of course, in addition to providing an interface with the vehicle system 200, user interfaces 330 can also communicate with other systems and components in the UE 110, as is known.

The UE 110 can be one of a variety of electronic devices. For clarity, the UE 110 is described generally herein as a smart phone. One of skill in the art will recognize, however, that systems 100, 400 and methods 500, 600, 700 can also be used with a variety of other electronic devices such as tablet computers, laptops, and other portable network (e.g. cellular or internet protocol network) connected devices. These devices are referred to collectively herein as UEs. The UEs can include a number of components to execute the above-mentioned functions and applications. The UE 110 illustrated in FIG. 3 is also illustrated as including ports 336, non-removable storage 354, and removable storage 356 as is typical of portable computing devices. Ports 336 and transceivers 318 can be used to communicate with any number of peripherals, external computing devices, cloud storage, etc. The UEs 110 can also include additional data storage devices (removable 356 and/or non-removable 354) such as, for example, magnetic disks, optical disks, or tape.

The memory 220, 320 illustrated in FIGS. 2 and 3 can include non-transitory computer-readable medium that can include volatile and non-volatile, removable and non-removable tangible, physical media implemented in technology for storage of information, such as computer readable instructions, data structures, program modules, or other data. The memory 220, 320, removable storage 356, and non-removable storage 354 are all examples of non-transitory computer-readable media. Non-transitory computer-readable media include, but are not limited to, random access memory (RAM), read-only memory (ROM), electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 110 and/or the vehicles 130. Any such non-transitory computer-readable media can be part of the UEs 110 and/or the vehicles 130 or can be a separate database, datalink, remote server, or cloud-based server.

Figure 4:
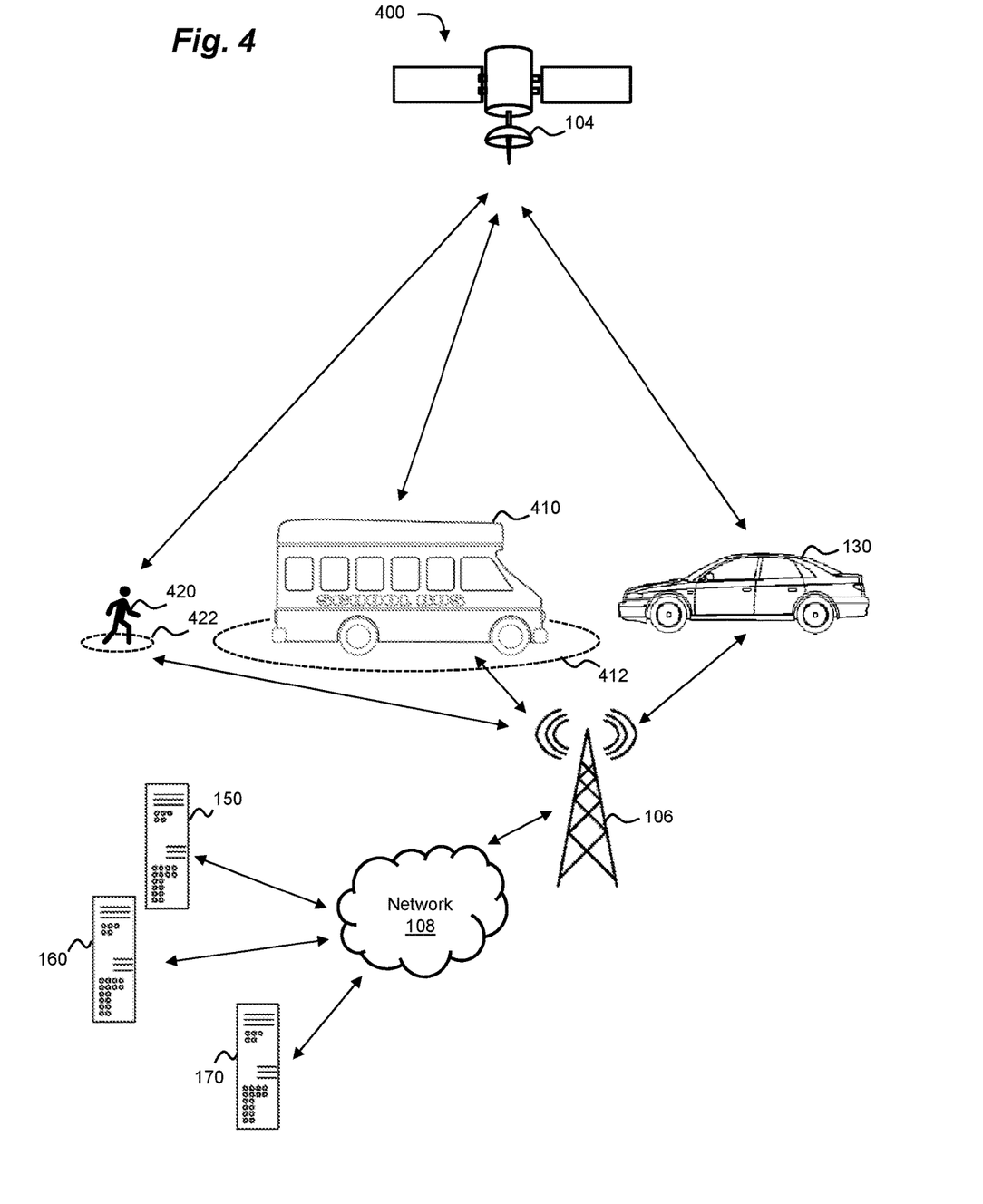
FIG. 4 depicts an example of a system for communicating with a vehicle and providing geofencing to improve driving safety, in accordance with some examples of the present disclosure.

Turning now to FIG. 4, as mentioned above, it may also be useful to utilize GPS devices to generate geofences in certain circumstance. FIG. 4 illustrates a system 400 in which geofences 412, 422 can be established around, for example, a pedestrian 420 and a school bus 410. In some examples, mobile GPS devices having a high accuracy GPS sensor and a transceiver can be carried by the pedestrians 420 and/or installed on the school bus 410. The mobile GPS devices can transmit coordinates and other data to define a geofence. Data that can be used to define a geofence can include coordinates defining a boundary of the geofence, information on the user of the mobile GPS device (e.g. pedestrian, vehicle, road block, emergency vehicle, school bus, construction equipment, etc.), the speed of the mobile GPS device, the trajectory of the mobile GPS device, a set speed limit within the geofence, a distance from the GPS device (e.g., a geofence radius), etc.

The vehicle 130 can receive the geofence data transmitted by the mobile GPS devices and calculate, for example, modified speed limits and/or or virtual road block positions based on the geofence data. In some applications, the mobile GPS device can compute coordinates defining a boundary for the geofence and a speed limit within the geofence, which can be included in the geofence data. This can reduce processing at each individual vehicle 130, which can be advantageous when vehicles 130 are receiving geofence data from a multitude of mobile GPS devices. On the other hand, it may be advantageous for a vehicle 130 to compute coordinates defining the boundary of the geofence and the speed limit within the geofence. In some examples, the vehicle 130 (or a device included therein) can calculate the geofence boundary and speed limit based on the geofence data, including the coordinates of the mobile device, and a variety of other data from the vehicle 130 or UE 110. It may be advantageous for a vehicle 130 to compute the boundary of a geofence around a pedestrian 420, for example, based on the speed at which the vehicle 130 is traveling. A vehicle 130 traveling at a higher speed can calculate a larger geofence around the pedestrian 420, for example, to account for the attendant increase in stopping distance.

In some examples, computing geofence boundaries and speed limits can be carried out by one or more of the service provider systems 150, 160, 170. One of the service provider systems 150, 160, 170 can be a dedicated geofencing service, for example, that can compute and transmit the geofence boundaries and speed limits to multiple vehicles 130 in real time, as needed. The geofencing service may be able to provide increased computing power when compared to each individual mobile device (e.g., UE 110) or vehicle 130. The geofencing service can also provide centralized data storage for storing the geofence data, including any permanent geofencing data (e.g., crosswalks, school zones, etc.). The geofencing service may therefore be advantageous in reducing the computational loads on the UEs 110 and vehicles 130. Further, data gathered by the service can be used to predict traffic patterns for city planning efforts or for improved vehicle navigation services, among other things.

Navigational systems that are a part of the vehicle system 200 or the UE 110 could utilize the coordinates defining the boundary of the geofence and speed limit within the geofence in a similar way that navigational systems currently use traffic patterns to determine the shortest route of travel. As vehicles become more automated, geofence data can be used to control the speed and trajectory of the vehicle 130. Of course, geofences could also be established around any number of objects including temporary street closures, stop lights, stop signs, vehicles engaging in risky driving practices, student drivers, emergency response vehicles in route to an emergency, police vehicles, bicycles, motorcycles, etc.

Figure 5:
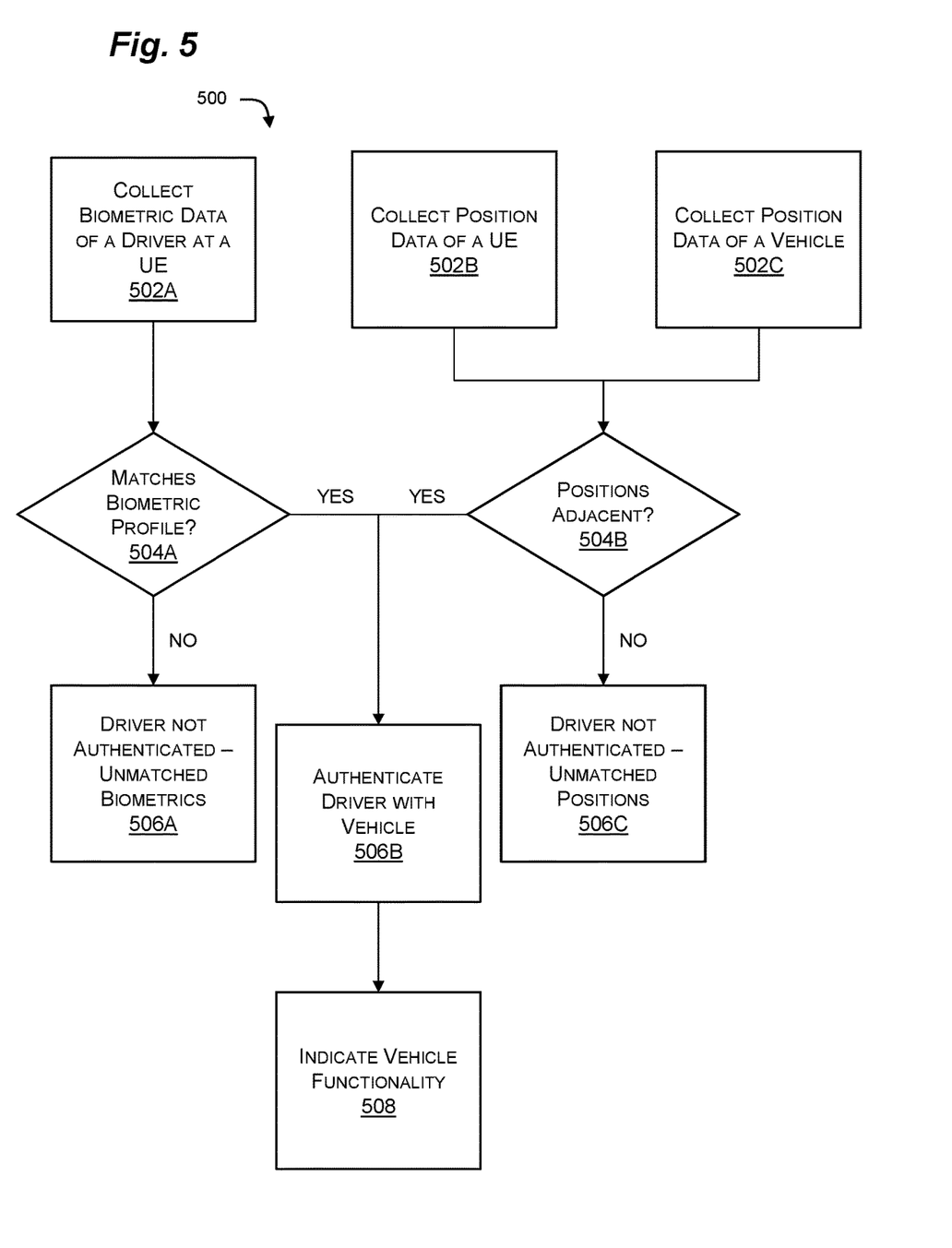
FIG. 5 is a flowchart depicting an example of a method for authenticating a driver with a vehicle, in accordance with some examples of the present disclosure.
Figure 6:
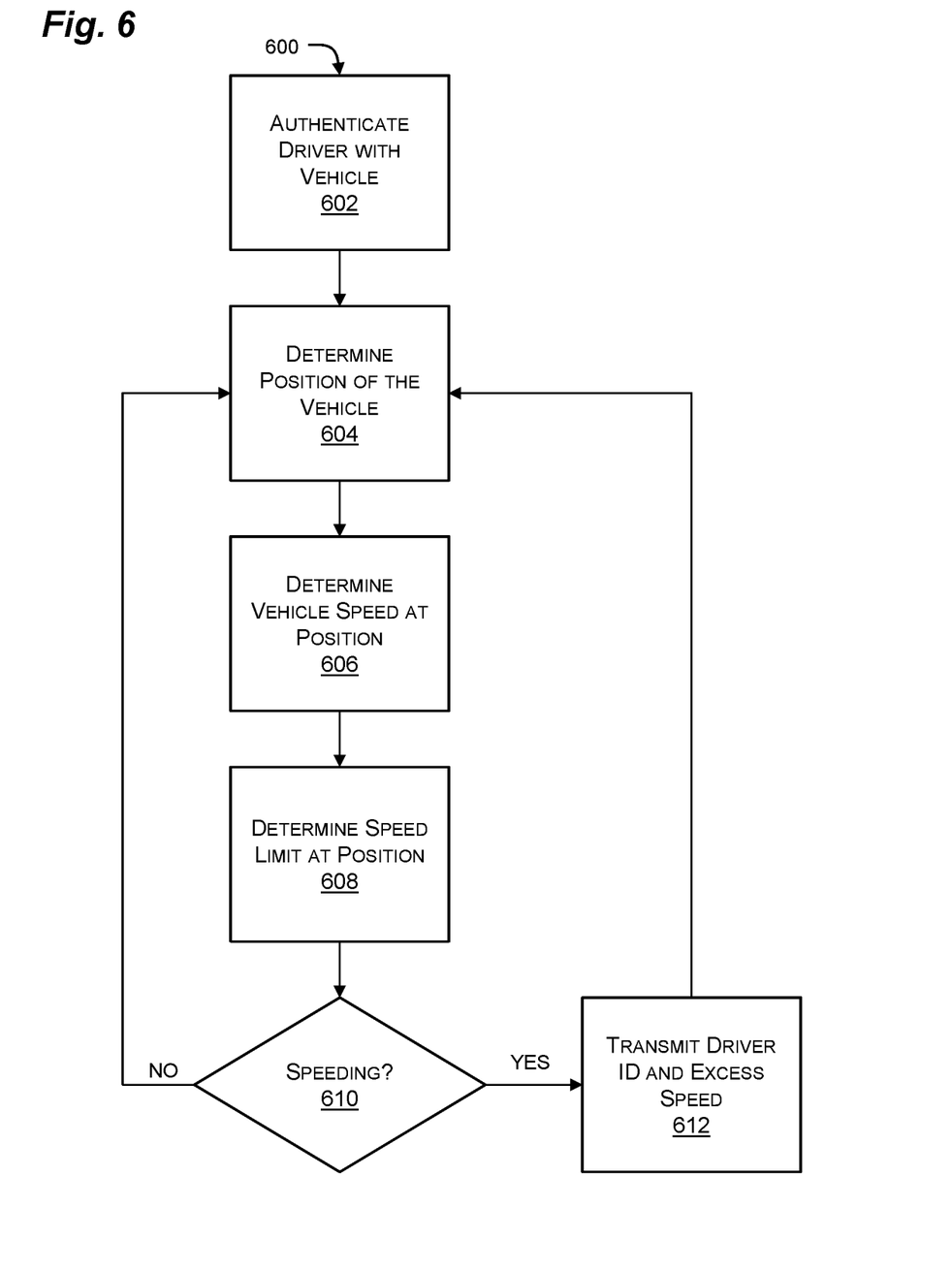
FIG. 6 is a flowchart depicting an example of a method for automatically detecting a speeding violation and reporting the violation, in accordance with some examples of the present disclosure.
Figure 7:
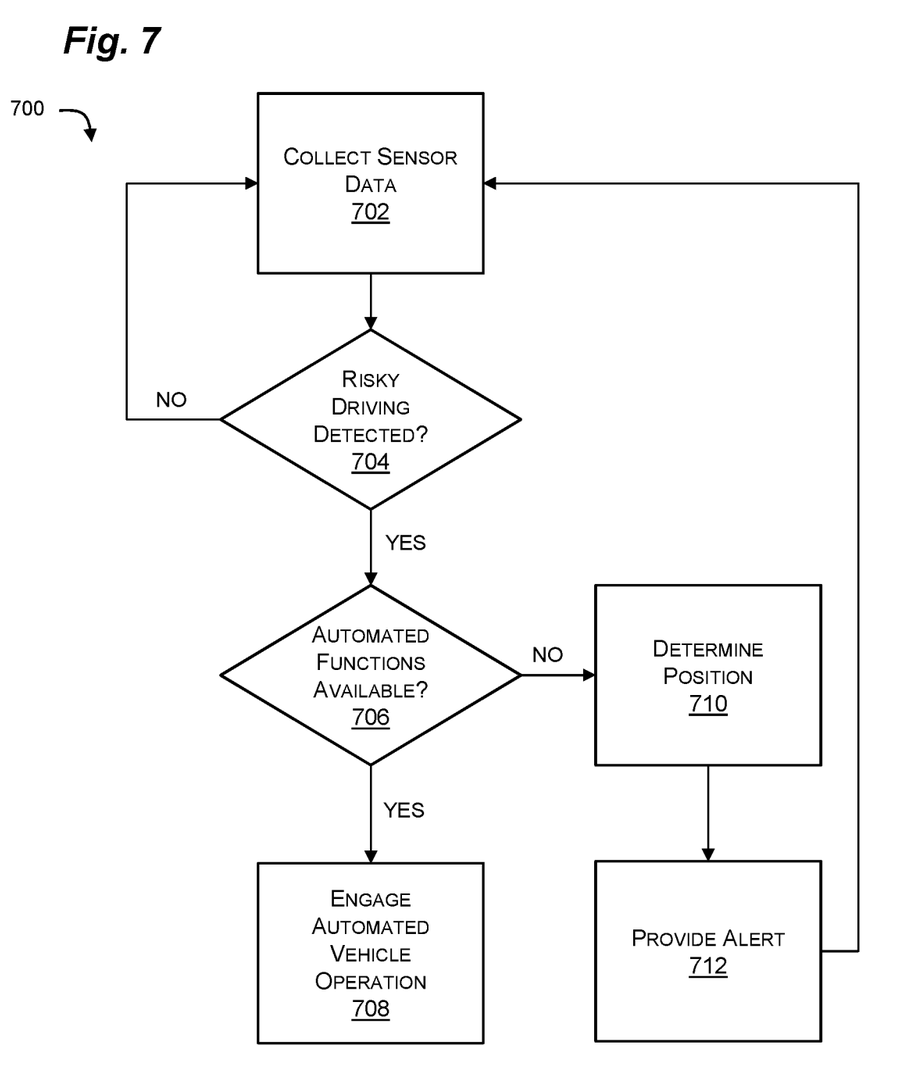
FIG. 7 is a flowchart depicting an example of a method for detecting a driving risk and acting to remediate the risk, in accordance with some examples of the present disclosure.

As shown in FIGS. 5, 6, and 7, examples of the present disclosure can also comprise methods 500, 600, 700 for authenticating drivers, detecting speeding, and detecting risky driving, respectively. Elements of systems 100, 400, including the UEs 110 and vehicles 130 described herein can be utilized to perform methods 500, 600, 700. It is also contemplated that other user devices, vehicles, and other equipment, both known and yet to be developed, could be utilized to perform methods 500, 600, 700. As a result, variations in the methods 500, 600, 700 that can be performed by such other devices and vehicles are intended to be included within the scope of the present disclosure.

As shown in FIG. 5, examples of the present disclosure can comprise a method 500 for authenticating a driver with a vehicle. The method 500 serves to verify that the driver is authorized to use the vehicle and is actually near, or in, the vehicle by using biometric data and GPS data, respectively, gathered by a UE and/or the vehicle. A biometric sensor on the vehicle or UE can collect biometric data from the user, which can be compared to stored biometric data as a first form of authentication. The GPS data from the UE can then be compared to the GPS data from the vehicle to provide a second form of authentication (i.e., that the user is in, or near, the vehicle). Thus, two-factor authentication can be provided efficiently and with minimal input from the user.

At 502, the necessary data can be collected from the UE and/or the vehicle. At 502A, the UE (or a sensor in the vehicle) can collect biometric data from a driver (e.g., a fingerprint from a fingerprint scanner). In some examples, when the collection of biometric data is performed by the UE, the UE may also transmit the biometric data from the UE to the vehicle. At 502B, the UE can determine its position and may also transmit this data to the vehicle. At 502C, the vehicle can determine its position. Steps 502A, 502B, and 502C can be performed in any order or simultaneously.

At 504A the biometric data of the driver can be compared against one or more stored biometric profiles by the UE or by the vehicle system. When the comparison of the biometric data fails (i.e., the biometric data doesn't match one of the biometric profiles), then at 506A, the UE and/or the vehicle can determine that the driver is not authenticated. In this case, the vehicle or the UE may provide an alert to the user that authentication has failed and/or an opportunity to resubmit biometric data. When the authentication fails a predetermined number of times (e.g., 1, 3, or 5 times), the vehicle may be disabled or "locked-down" for a predetermined amount of time, for example, or until an authorized user is authenticated.

At 504B the position data of the UE can be compared with the position data of the vehicle by the UE or by the vehicle system. Positional data may be transmitted from the UE to the vehicle, or vice-versa, depending on where the comparison is performed—i.e., on the UE or on the vehicle. When the comparison of the positions determines that the positions are not within a predetermined distance (e.g., within a couple of feet), then at 506C, the UE and/or the vehicle can determine that the driver is not authenticated. In some examples, depending on the vehicle, user, location, or other factors, the predetermined distance may be small enough (e.g., within 1 foot) that the user essentially has to be inside the car. In other applications, such as when the vehicle includes remote starting, the user can be within a larger radius (e.g., 25 or 50 feet).

When it is determined that the biometric data of the driver matches one of the stored biometric profiles and the UE and the vehicle are sufficiently close, then at 506B, the UE and/or the vehicle can determine that the driver is authenticated, and the UE can be paired to the vehicle. At 508, the driver, or an application on the UE, can be provided with an indication of vehicle functionality. In other words, different users may be provided with different levels of use in the vehicle. A 16-year-old student driver, for example, may be informed that he or she cannot exceed 45 MPH and cannot use interstates. An elderly driver, on the other hand, may be informed that they are only authorized to drive during daylight hours due to failing eyesight. Of course, other features, such as travel alerts, traffic alerts, and autonomous features could also be provided.

As shown in FIG. 6, examples of the present disclosure can also comprise a method 600 for automatically enforcing speed limits. In its simplest form, the method 600 serves to automatically detect that a vehicle is speeding and provide a legal authority with sufficient information to perform remediation such as issuing a speeding ticket or deploying an officer to pursue the vehicle. This is an improvement over methods that require a police officer, drone, or other speed detector to be on site because the vehicle can report its own speed, and no police officer or speed detector outside the vehicle need be present near the vehicle in order for the speed to be reported. As discussed below with reference to FIG. 7, the method 700 may instead automatically reduce the speed of the vehicle for the safety and convenience of the driver.

At 602 the driver can be authenticated with the vehicle for example by following method 500, by other means described herein, or variations thereof. A vehicle (e.g., vehicle 130) and/or a personal electronic device (e.g., UE 110) can be used to authenticate the driver with the vehicle, as described above. In some examples, the driver profile 228 stored in the vehicle system 200, for example, can include the driver's full name, driver's license number, state, and other relevant information.

At 604, the position of the vehicle can be determined. The vehicle can include a GPS sensor, for example, and the position of the vehicle can be determined based on GPS data. Alternatively, or additionally, an electronic device being carried within the vehicle, such as a UE, can comprise a GPS sensor or cellular location services, among other things, and can provide the vehicle location data by virtue of its authentication with the vehicle. In other words, because ensuring the vehicle and the UE are in the same location is part of the authentication process, in some examples, the vehicle's position can be determined within an acceptable margin of error based on the position of the smart phone.

At 606, the speed of the vehicle can be determined. This information can be obtained from the VSS, for example, the vehicle's GPS, or the UE. The speed of the vehicle can be taken in real-time and thus, can be associated with the position of the vehicle.

At 608, the speed limit at the position at which the vehicle's speed was measured can be determined. In some examples, the vehicle can have memory that contains a map with speed limits for each street, for example, the vehicle can determine the speed limit based on relevant geofencing data, or the vehicle can receive a transmission from a service provider system 150, 160, 170 that includes the speed limit. In other examples, the position of the vehicle can be transmitted to the legal authority, and the legal authority can determine the speed limit at that position. In such a case, determining the speed limit at the position of the vehicle can include transmitting the position coordinates from the vehicle to, and receiving the speed limit from, the legal authority.

At 610, the vehicle speed can be compared to the speed limit to determine whether the vehicle is speeding. In some examples, this determination can be based purely on whether the speed of the vehicle exceeds the speed limit at any single position. In other examples, the determination can take into account factors such as the vehicle crossing a boundary between two speed zones, whether the vehicle is exceeding the speed limit by a predetermined amount (e.g., speeding by up to 5 MPH may be deemed "acceptable"), and/or how long (time or distance) the vehicle travelled while exceeding the speed limit. If the vehicle only exceeded the speed limit for a relatively short amount of time (e.g., 5 seconds) and then slowed, then the vehicle may not be considered to be speeding. This may enable drivers to perform emergency maneuvers, for example, in which their speed is temporarily increased to avoid a collision. The speeding determination, therefore, can take into account data gathered from one or more of steps 604, 606, and 608, as well as external, and other, data.

The comparison can be performed by the vehicle system and/or by the UE. Additionally, or alternatively, the comparison can be performed by the legal authority or a service provider system (e.g., service provider systems 150, 160, 170). In this configuration, the step of comparing the vehicle speed to the speed limit (e.g., at 610) can include transmitting the vehicle speed and the vehicle's position and/or the local speed limit to the legal authority or service provider system. In some examples, the legal authority or the service provider system can perform the step of determining the speed limit at the position (e.g., at step 608), obviating the need for the vehicle to transmit the speed limit.

When it is determined that the vehicle is not speeding, then method 600 can continue iteratively and return to step

604. In some examples, the method 600 can be performed continuously or periodically (e.g., every 1 or 5 seconds) until the vehicle is parked. When it is determined that the vehicle is speeding, on the other hand, then at 612, information identifying the driver and indicating the excess speed of the vehicle can be transmitted from the vehicle to the local authority. The information transmitted can be sufficient for the local authority to make a record of the driver's habits and/or take action against the driver (e.g., issue a citation). As before, the method 600 can be performed iteratively to constantly, or periodically, monitor the vehicle's speed and take action when necessary.

As shown in FIG. 7, examples of the present disclosure can comprise a method 700 for automatically detecting and communicating risky driving practices. In its simplest form, the method 700 serves to automatically detect a driving risk and send an alert that can be used by the driver, nearby vehicles, and/or others (e.g., pedestrians) to avoid the risk. This is an improvement over methods that use traffic patterns on navigational system maps and amber alerts, for example, because the driving risks can be detected in real-time and alerts can be transmitted to one or more vehicles or people that could be affected by the driving risk.

At 702, sensor data can be collected related to the operation of the vehicle. The sensor data can be collected from sensors on the vehicle (e.g., from the vehicle system 200) and/or from the UE or other device transported by the vehicle. The sensor data can include vehicle speed data, yaw rates, acceleration rates, antilock braking system (ABS) data, electronic stability control (ESC) data, GPS or cellular location services data, etc.

At 704, the sensor data can be analyzed to determine if a risky driving activity such as, for example, speeding, hard braking, driving over a large pot hole, a collision, driving off the road, driving the wrong way down a one-way street, weaving, or running stop signs has occurred. The sensor data can be analyzed by the vehicle or by the UE. If the analysis is performed by the vehicle and is based at least in part on sensor data collected by the UE, some sensor data can be transmitted from the UE to the vehicle, as necessary. Likewise, if the analysis is performed by the UE, and is based at least in part on sensor data collected at the vehicle, some sensor data can be transmitted from the vehicle to the UE. Excessive speeding and/or yaw rates, for example, can indicate that the driver is driving erratically.

If risky driving is not detected, then at 702, the method 700 can continue iteratively to continuously, or periodically, collect and analyze sensor data to detect risky driving. If risky driving is detected, on the other hand, then at 706, the vehicle's systems can be evaluated to determine if the vehicle has automated functionality to attempt to resolve the risky driving. If the vehicle has a cruise control, for example, the vehicle may be able to disengage the cruise control to reduce the vehicle's speed. If the vehicle has autonomous, or semi-autonomous, capabilities, the vehicle may be able to slow down, steer into the emergency lane, and/or activate the hazard lights, among other things.

If the vehicle does have one or more automated functions, then at 708, the automated vehicle control can engage to reduce the driving risk (e.g. adjusting the speed of the cruise control or braking). If the vehicle does not have automated functionality, on the other hand, then at 710, the position of the vehicle can be determined, either based on a GPS sensor in the vehicle or a GPS sensor or cellular location services provided by the UE.

At 712, an alert can be transmitted by the vehicle system and/or by the UE to provide the position of the vehicle and the driving risk detected. In some examples, the alert can be transmitted over a short-range wireless channel (e.g., Bluetooth®) so that only vehicles and devices near the vehicle—and thus, at risk—are within range of the transmission. In other examples, the alert could be transmitted to a service provider that then transmits the alert to vehicles and devices based on their position and/or trajectory. In some examples, an alert may also be provided to the driver. The alert may be provided via the UE, for example, or on the head unit or dash display of the vehicle.

While several possible examples are disclosed above, examples of the present disclosure are not so limited. While the systems and methods above are discussed with reference to street vehicles and road traffic, for instance, the systems and methods can also be used for airplanes, boats, and other vehicles. In addition, while various functions are discussed as being performed by a vehicle system, smart phone, cellular transceiver, GPS sensor, GPS satellite, etc. other components could perform the same or similar functions without departing form the spirit of the invention.

The specific configurations, machines, and the size and shape of various elements can be varied according to particular design specifications or constraints requiring a vehicle pairing system, biometric interface, processor, memory, transceiver, and/or vehicle to UE interface constructed according to the principles of this disclosure. Such changes are intended to be embraced within the scope of this disclosure. The presently disclosed examples, therefore are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a vehicle system and from a user equipment (UE) associated with a user, (i) a biometric identifier associated with the user and (ii) location data for the UE;
   determining, by the vehicle system, location data for the vehicle;
   comparing, by the vehicle system, the location data of the vehicle with the location data of the UE;
   authenticating, by the vehicle system, the user based on the biometric identifier and the comparison of the location data of the vehicle with the location data of the UE;
   collecting, by the vehicle system, sensor data;
   analyzing, by the vehicle system, the sensor data to detect a driving risk;
   determining, by the vehicle system, a position of the vehicle when the driving risk is detected; and
   engaging, by the vehicle system, an automated operation of the vehicle in response to detecting the driving risk.

2. The method of claim 1, wherein authenticating the user based on the biometric identifier and the comparison of the location data further comprises:
   comparing, by the vehicle system, the biometric identifier with each biometric profile of multiple biometric profiles stored in a memory of the vehicle system; and
   authenticating, by the vehicle system, the user when the biometric identifier and a biometric profile of the multiple biometric profiles match.

3. The method of claim 1, further comprising:
   receiving, by the vehicle system, a control command signal comprising instructions to cause the vehicle to perform an automated operation.

4. The method of claim 3, wherein:
the control command signal is received from a law enforcement agency; and
the automated operation comprises slowing or stopping the vehicle.

5. The method of claim 1, wherein receiving the biometric identifier associated with the user comprises receiving, at a transceiver of a dongle in communication with an on-board diagnostics (OBD) port of the vehicle, the biometric identifier associated with the user; and
wherein receiving location data of the UE comprises receiving, at the transceiver of the dongle, the location data of the UE.

6. The method of claim 5,
wherein comparing the location data of the vehicle with the location data from the UE comprises, determining, by the dongle, that the location data of the vehicle is within a predetermined distance of the location data from the UE; and
wherein authenticating the user based on the comparison of the location data and the biometric identifier comprises:
generating, by the dongle, authentication data based on the comparison of the location data and the biometric identifier; and
providing, by the dongle, the authentication data to the OBD port.

7. A method comprising:
receiving, at a vehicle system, a biometric identifier associated with a user;
determining, by the vehicle system, a geographical position of the vehicle system;
determining, by the vehicle system, a speed limit at the geographical position;
determining, by the vehicle system, a travel speed of the vehicle at the geographical position;
comparing, by the vehicle system, the speed limit to the travel speed; and
transmitting, by the vehicle system to a communication node, a data signal based on the biometric identifier and the comparison of the speed limit and the travel speed.

8. The method of claim 7, wherein determining the speed limit at the geographical position comprises:
receiving, by the vehicle system, coordinates defining a geofence and a localized speed limit within the geofence;
determining, by the vehicle system, that the geographical position of the vehicle is within the geofence; and
determining, by the vehicle system, that the speed limit at the geographical position is equal to the localized speed limit.

9. The method of claim 7, further comprising:
determining, by the vehicle system, a legal authority associated with the geographical position; and
establishing, via the communication node, a communication channel between the vehicle system and the legal authority.

10. The method of claim 9, further comprising:
receiving, at the vehicle system from the legal authority, a speeding violation citation.

11. The method of claim 9, further comprising:
receiving, at the vehicle system from the legal authority, a control command signal comprising instructions to cause the vehicle to perform an automated operation.

12. The method of claim 11, wherein the automated operation comprises one or more of providing a visual user alert, providing an auditory user alert, setting a maximum allowable speed limit, cutting power to a powertrain of the vehicle, locking a door of the vehicle, or engaging an autonomous, or semi-autonomous, driving system of the vehicle.

13. A method comprising:
collecting, with user equipment (UE), a biometric identifier for a user;
collecting, with the UE, location data of the UE;
receiving, by the UE, location data for a vehicle;
comparing, by the UE, the location data of the vehicle and the location data of the UE;
authenticating, by the UE, the user with the vehicle based on the biometric identifier, the location data of the vehicle, and the location data of the UE;
collecting, by the UE, vehicle sensor data from the vehicle;
collecting, by the UE, sensor data from sensors onboard the UE;
analyzing, by the UE, the vehicle sensor data and the UE sensor data to detect a driving risk;
determining, by the UE, a position of the vehicle when the driving risk is detected as occurring; and
wirelessly transmitting, by the UE, an alert based on the determined position of the vehicle and the driving risk.

14. The method of claim 13, wherein authenticating the user with the vehicle based on biometric data and the comparison of the location data further comprises:
comparing, by the UE, the biometric data with a biometric profile stored in a memory store of the UE, and
authenticating, by the UE, the user with the vehicle based when the biometric identifier matches the biometric profile.

15. The method of claim 13, further comprising:
transmitting, by the UE, a wireless signal to a communication node including at least part of the vehicle sensor data.

16. The method of claim 13, further comprising:
sending, from the UE, a request to pair with a vehicle system based on the authentication of the user; and
providing, from the UE to the vehicle system, a control command signal comprising instructions to cause the vehicle to perform an automated operation.

* * * * *